(12) United States Patent
Woods et al.

(10) Patent No.: US 9,435,060 B2
(45) Date of Patent: Sep. 6, 2016

(54) CONTINUOUS WOUND COMPOSITE TRUSS STRUCTURES

(71) Applicant: University of Maryland, College Park, MD (US)

(72) Inventors: Benjamin K. S. Woods, Barnesville, MD (US); Benjamin Otto Berry, Alameda, CA (US); Vladimir Bohdan Stavnychyi, Centreville, VA (US)

(73) Assignee: UNIVERSITY OF MARYLAND, College Park, MD (US)

( * ) Notice: Subject to any disclaimer, the term of this patent is extended or adjusted under 35 U.S.C. 154(b) by 434 days.

(21) Appl. No.: 13/874,865

(22) Filed: May 1, 2013

(65) Prior Publication Data
US 2013/0291709 A1 Nov. 7, 2013

Related U.S. Application Data

(60) Provisional application No. 61/641,153, filed on May 1, 2012.

(51) Int. Cl.

| D04C 1/06 | (2006.01) |
|---|---|
| D04C 3/48 | (2006.01) |
| B29C 53/58 | (2006.01) |
| E04C 3/29 | (2006.01) |
| B64C 3/18 | (2006.01) |
| B64C 3/22 | (2006.01) |
| B64C 27/473 | (2006.01) |

(52) U.S. Cl.
CPC .............. *D04C 1/06* (2013.01); *B29C 53/58* (2013.01); *B64C 3/185* (2013.01); *B64C 3/22* (2013.01); *B64C 27/473* (2013.01); *D04C 3/48* (2013.01); *E04C 3/291* (2013.01); *B64C 2027/4736* (2013.01)

(58) Field of Classification Search
CPC ............ E04C 3/29; E04C 3/291; D04C 1/06
USPC .............................................. 57/3, 11, 13, 15
See application file for complete search history.

(56) References Cited

U.S. PATENT DOCUMENTS

| 2,390,180 | A | | 12/1945 | Sahlberg |
| 2,843,153 | A | | 7/1958 | Young |
| 3,202,560 | A | | 8/1965 | Michael |
| 3,501,880 | A | * | 3/1970 | Bosch ............................. 52/222 |
| 3,798,864 | A | * | 3/1974 | Georgii ...................... 52/651.11 |
| 3,882,662 | A | * | 5/1975 | Hazelwood ................... 242/442 |
| 3,969,869 | A | | 7/1976 | Partridge |

(Continued)

*Primary Examiner* — Shaun R Hurley
(74) *Attorney, Agent, or Firm* — Carter, DeLuca, Farrell & Schmidt, LLP

(57) ABSTRACT

Ultra-efficient composite truss structures and methods for manufacturing the same using low cost and high throughput winding processes are presented. The present disclosure describes combining the high structural efficiency of truss structures with the excellent mechanical properties of composite materials using processes that mitigate the high manufacturing costs typical of composite materials. The present disclosure further describes creating the members of the truss structure through continuous winding of either thermoset or thermoplastic matrix, fiber reinforced composite members around a central mandrel. The longitudinal chord members of the truss are held in position by the mandrel, and the web members are wrapped under the chord members, over them, or both. The web members are bonded to the chord members during manufacture to produce a single consolidated truss structure.

29 Claims, 7 Drawing Sheets

(56) References Cited

U.S. PATENT DOCUMENTS

| | | | |
|---|---|---|---|
| 3,970,495 A | 7/1976 | Ashton et al. | |
| 4,096,781 A | 6/1978 | Bock et al. | |
| 4,224,787 A * | 9/1980 | Jackson et al. | 57/15 |
| 4,241,117 A * | 12/1980 | Figge | 428/36.3 |
| 4,317,316 A | 3/1982 | Atwood et al. | |
| 4,539,785 A * | 9/1985 | Overbo | 52/309.1 |
| 4,566,247 A * | 1/1986 | Overbo | 52/843 |
| 5,457,927 A | 10/1995 | Pellock et al. | |
| 6,026,626 A | 2/2000 | Fisher | |
| 6,250,193 B1 * | 6/2001 | Head | 87/2 |
| 6,401,442 B1 * | 6/2002 | Root et al. | 57/27 |
| 6,490,852 B1 * | 12/2002 | Mustacich et al. | 57/3 |
| 6,598,510 B1 | 7/2003 | Kim | |
| 6,945,026 B1 * | 9/2005 | Hanna | 57/3 |
| 7,132,027 B2 | 11/2006 | Jensen | |
| 7,921,630 B2 * | 4/2011 | Scholten et al. | 57/6 |
| 2005/0115186 A1 | 6/2005 | Jensen et al. | |
| 2010/0170183 A1 * | 7/2010 | Abulaban | 52/576 |
| 2010/0175817 A1 * | 7/2010 | Scholten et al. | 156/190 |
| 2012/0266561 A1 * | 10/2012 | Piedmont | 52/834 |

* cited by examiner

CONTINUOUS WOUND COMPOSITE TRUSS STRUCTURES

PRIORITY CLAIM

The present application claims priority to and the benefit of the previously filed provisional application assigned U.S. Provisional Patent Application No. 61/641,153, entitled "Continuous Wound Composite Truss Structures," filed on May 1, 2012, the entire contents of the provisional patent application are incorporated herein by reference.

BACKGROUND

1. Technical Field

The present disclosure, inter alia, relates to continuous wound composite truss structures and methods of manufacturing the same. Lightweight, efficient structures built using the continuous wound composite structures of the present disclosure can be applied to any industry, application, component, or device where structural efficiency and low manufacturing cost are of concern.

2. Description of Related Art

Structural components which are created by winding composite materials are known in the prior art. Prior art typically uses unidirectional composite tow or pre-impregnated tape of either thermoset or thermoplastic matrix chemistry and builds up a solid structure by making many passes over a mandrel. The thickness of the finished part is built up over many passes, with each winding covering only a small portion of the finished structure, as in U.S. Pat. Nos. 3,202,560, 2,843,153, and 3,970,495.

The use of truss structures to increase structural efficiency is also known in the prior art. Many patents have been awarded for construction details and manufacturing methods for truss structures. U.S. Pat. Nos. 2,390,180, 3,969,869, 4,317,316, 5,457,927, and 6,026,626 all cover the details of the design and construction of various truss structures. A common approach in these patents is the use of many discrete members which are joined together to form the truss.

A filament-wound composite truss structure has been disclosed in U.S. Patent Application No. 2005/0115186, with the details of its construction being covered in U.S. Pat. No. 7,132,027. This technology creates truss structures from composite materials through a braiding process. A key feature of the structure shown in Application No. 2005/0115186 is the use of non-traditional truss geometries with cross sections made of multiple closed polygons rotated relative to each other.

The process disclosed in U.S. Pat. No. 7,132,027 is significantly complex. The basic assembly motion in U.S. Pat. No. 7,132,027 is similar to that of a braiding machine, such as the one disclosed in U.S. Pat. Nos. 4,096,781 and 6,598,510, where all of the helically wrapped elements are created at once via a braiding motion of the different filaments.

SUMMARY

The present disclosure is directed truss structures manufactured using fiber reinforced composite materials and continuous winding processes. The manufacturing process uses a winding apparatus and a mandrel to wind web material around truss chord members. The web material wraps around the chord members and bonds to them at repeating intervals, forming many web members from a single continuous piece or section of stock material.

The continuous wound composite truss structures and methods of manufacturing the same according to the present disclosure offer many advantages over those disclosed in the prior art. The truss structures according to the present disclosure differ significantly from prior art structural components in that each pass of composite wound around the mandrel is intended to create a complete or substantial portion of a structural element. The winding of the truss structures according to the present disclosure is more discrete than typical filament winding of prior art structural truss structures or components, thereby leaving an open truss structure instead of a closed walled tube. Additionally, the web members of the truss structures according to the present disclosure may be thicker, of different geometry, and of more complex construction than the filaments used in prior art structural components to reflect their role as complete structural members.

Further, the geometries, materials, and construction methods used to manufacture the truss structures according to the present disclosure differ significantly from the geometries, materials, and construction methods used to manufacture prior art structural components, such as those methods described in U.S. Pat. Nos. 2,390,180; 3,969,869; 4,317,316; 5,457,927; and 6,026,626. As described above, a common approach in these patents is the use of many discrete members which are joined together to form the truss; this is fundamentally different from the approach according to the present disclosure of creating multiple truss structures or members from a continuous winding process. Furthermore, the geometries of the truss structures according to the present disclosure can have cross sections of single shapes, including lines, triangles, rectangles and polygons.

In one aspect of the present disclosure, there is provided a truss structure manufactured using a winding process. The process includes fastening at least two chord members in proximity to each other; operatively connecting the at least two chord members to a winding apparatus; and actuating the winding apparatus to rotate the at least two chord members to wound material around at least the two chord members from a first location to a second location which is spaced apart from the first location. Each pass of material wound around the at least two chord members creates a portion of the truss structure. The first location is at substantially in proximity to a first end of the at least two chord members and the second location is at substantially in proximity to a second end of the at least two chord members.

The actuating step includes actuating the winding apparatus in one of manually and automatically. During the actuating step, the material continuously wraps around the at least two chord members and makes contact with the at least two chord members at repeating intervals. A plurality of continuous web members is formed along the truss structure from a continuous section of material. The plurality of continuous web members can wrap around the at least two chord members in a quasi-helical fashion. The truss structure includes the at least two chord members extending the length of the truss structure and contacting a plurality of continuous web members wrapped around the at least two chord members.

The truss structure further can include at least one mandrel. The truss structure can also include a plurality of mandrels spaced apart from each other or contacting each other along the length of the truss structure. The truss structure can include fiber reinforced composite materials.

Another aspect of the present disclosure includes a truss structure having at least two chord members extending the length of the truss structure; and material wound around the at least the two chord members from a first location to a second location which is spaced apart from the first location. The material forms a plurality of continuous members between the first location and the second location. The plurality of continuous members contacts the at least two chord members at repeating intervals from the first location to the second location. The plurality of continuous web members wrap around the at least two chord members in a quasi-helical fashion. The first location is at substantially in proximity to a first end of the at least two chord members and the second location is at substantially in proximity to a second end of the at least two chord members.

The truss structure further can include a mandrel in proximity to the at least two chord members. The truss structure can also include one continuous mandrel extending substantially the length of the truss structure. The truss structure can include a plurality of mandrels contacting each other or spaced apart from each other along the length of the truss structure. The mandrel can be identical to an interior cross-section of the truss structure.

The truss structure can include fiber reinforced composite materials. The truss structure is manufactured using a continuous winding process for winding the material around the at least two chord members.

Another aspect of the present disclosure is a method for manufacturing a truss structure. The method includes fastening at least two chord members in proximity to each other; operatively connecting the at least two chord members to a winding apparatus; and actuating the winding apparatus to rotate the at least two chord members to wound material around at least the two chord members from a first location to a second location which is spaced apart from the first location. Each pass of material wound around the at least two chord members creates a portion of the truss structure. During the actuating step, the material continuously wraps around the at least two chord members and makes contact with the at least two chord members at repeating intervals. The first location is at substantially in proximity to a first end of the at least two chord members and the second location is at substantially in proximity to a second end of the at least two chord members.

A plurality of continuous web members is formed along the truss structure from a continuous section of material. The truss structure includes the at least two chord members extending the length of the truss structure. The at least two chord members contact the plurality of continuous web members wrapped around the at least two chord members. The plurality of continuous web members wrap around the at least two chord members in a quasi-helical fashion.

The method further includes providing a mandrel which can extend substantially the length of the truss structure. The method can include providing a plurality of mandrels either contacting or spaced apart from each other along the length of the truss structure. The truss structure can include fiber reinforced composite materials, including at least one reinforcement member on at least one web member. The actuating step includes actuating the winding apparatus in one of manually and automatically.

BRIEF DESCRIPTION OF THE DRAWINGS

Various preferred embodiments of the present disclosure are described herein with reference to the drawings, wherein.

DETAILED DESCRIPTION

In the Summary and Brief Description of the Drawings sections above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "at least" means one or more than one. When, in this specification, a range is given as "(a first number) to (a second number)" or "(a first number) (a second number)," this means a range whose lower limit is the first number and whose upper limit is the second number. For example, 25 mm to 100 mm means a range whose lower limit is 25 mm, and whose upper limit is 100 mm.

1. Truss Structure Configuration

Figure 1:
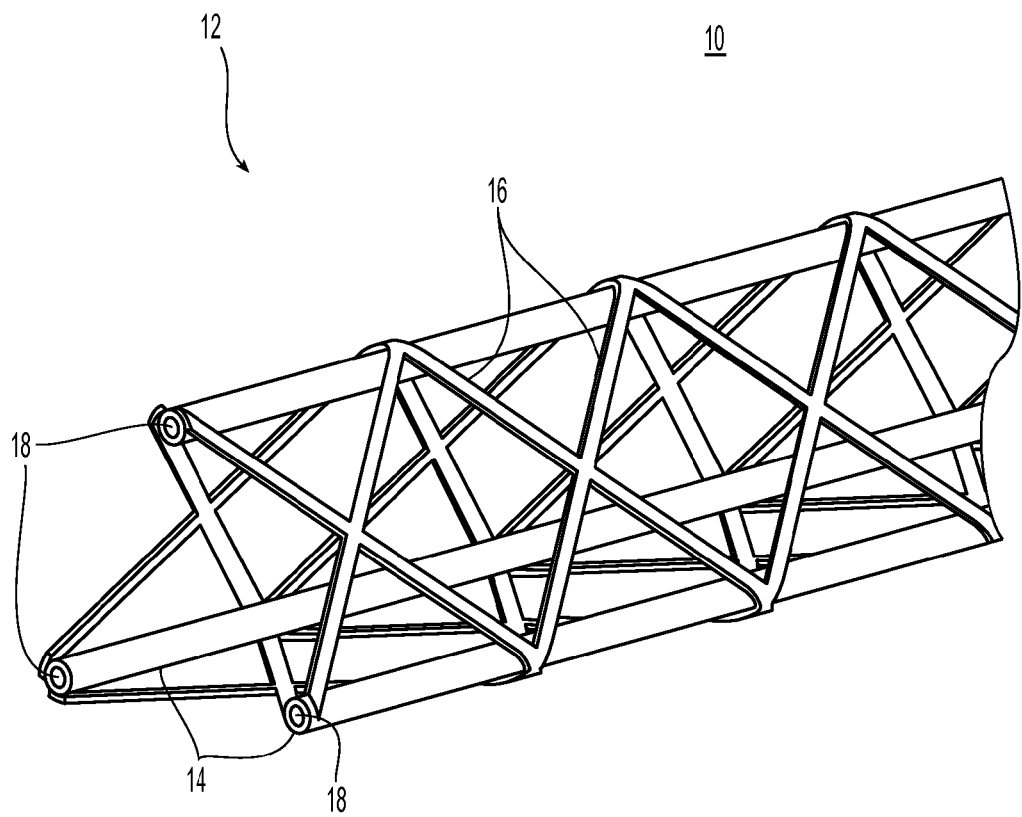
FIG. 1 illustrates one embodiment of a continuous wound truss structure according to the present disclosure.

With reference to FIG. 1, in one embodiment, the structure of a finished truss structure 10 according to the present disclosure. The truss structure 10 includes a truss 12 having three chord members 14 running the length of the truss structure 10 bonded to continuous web reinforcement members 16 which wrap around the chord members 14 in a quasi-helical fashion. The truss structure 10 may include any number of chord members 14 around its perimeter with either even or uneven spacing between adjacent chord members 14.

In a preferred embodiment, three chord members 14 are arranged with their centers 18 forming the vertices of an equilateral triangle. An alternate embodiment is a truss structure with four chord members arranged into a square. This embodiment may be preferred in certain situations for ease of integration with other structural elements.

Truss structures with two chord members may also be preferred to create two dimensional truss structures. The web reinforcement members may be of two families: the first wraps in a clockwise direction around the chord members and the second wraps in a counterclockwise direction. In embodiments, the web members may be bonded to the chord members at node locations, and may also be bonded to each other at the locations where they intersect. In embodiments, the truss may be straight and of some desired length with a constant cross section along its length, or it may incorporate taper, twist, curvature, and/or changes in cross section.

2. Mandrel

Figure 4:
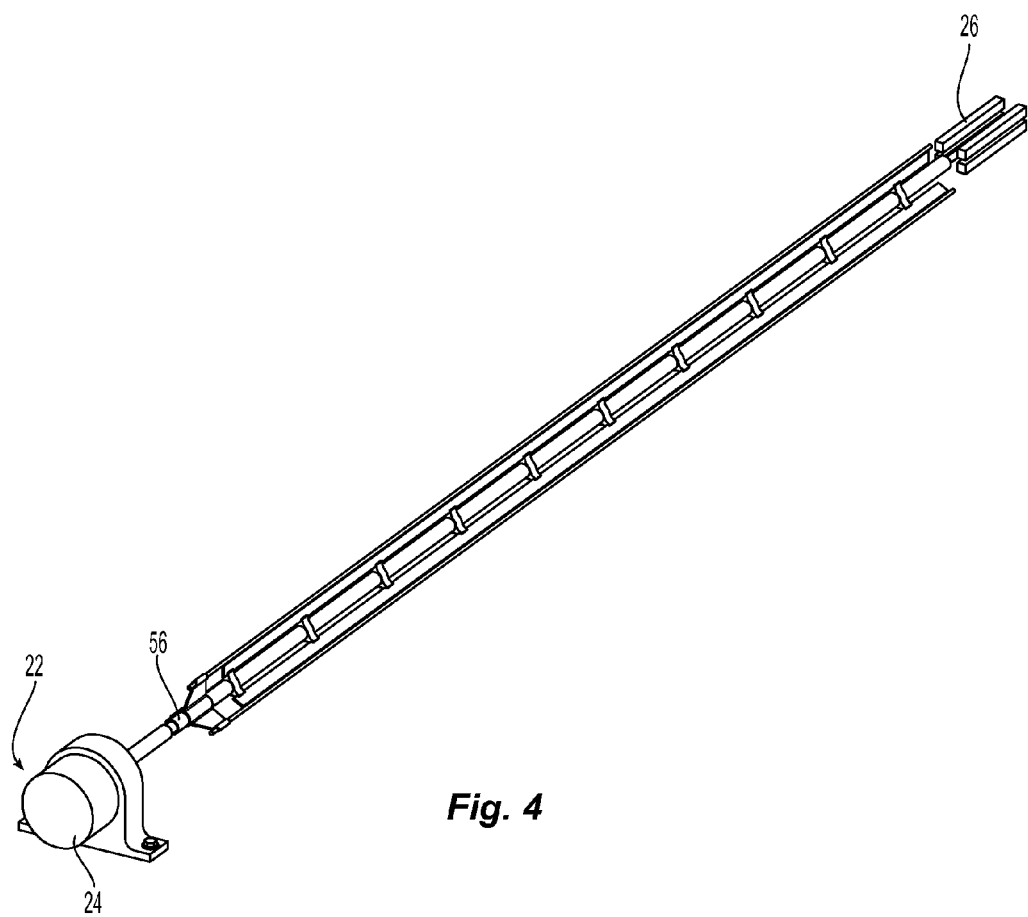
FIG. 4 illustrates a winding apparatus for use in manufacturing a continuous wound truss structure according to the present disclosure by using a manufacturing process according to the present disclosure.

With reference to FIGS. 2a-d, mandrel 20 serves the function of maintaining the relative position of the chord members 14 and web members 16 during manufacture of the truss 12, especially during actuation of the winding apparatus (see FIG. 4). The mandrel 20 can have the basic form of the final truss 12 including any taper, twist, curvature or changes in cross section.

Figure 5:
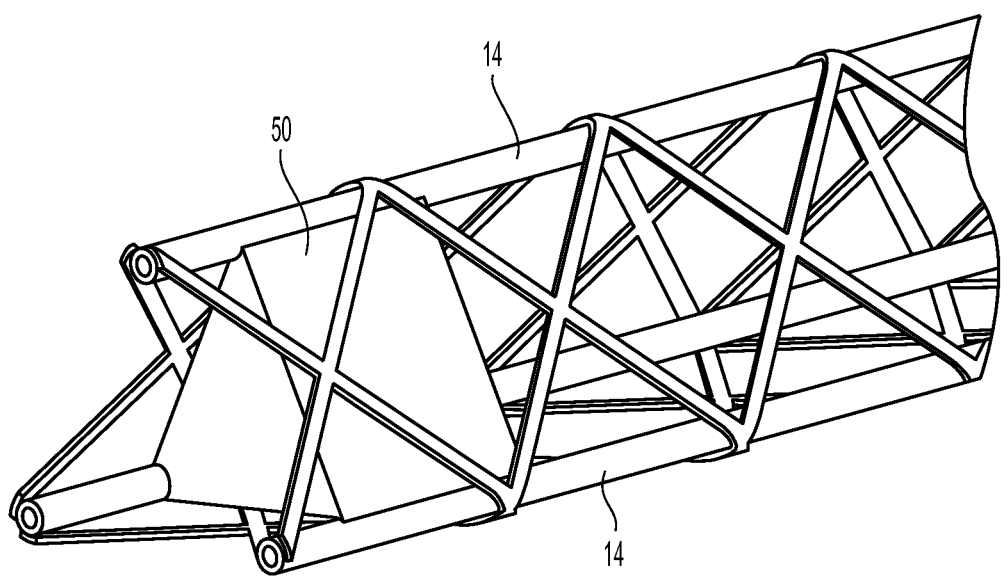
FIG. 5 illustrates an embodiment of a continuous wound truss structure according to the present disclosure employing carbon fiber, epoxy matrix thermoset composites and a discrete, permanent foam mandrel.
Figure 6A:
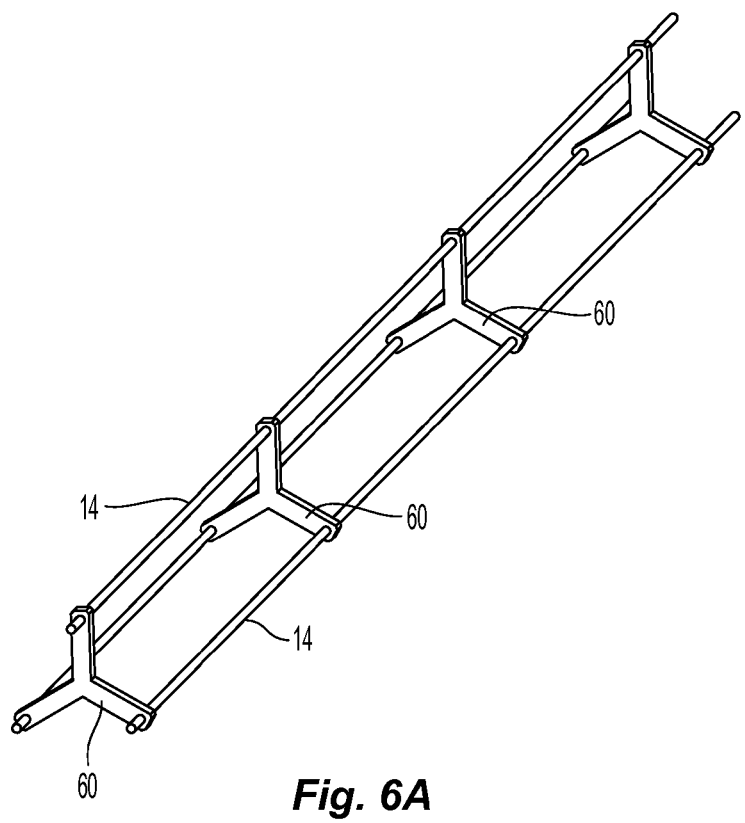
FIGS. 6a-b illustrate chord members held in place by mandrels and another embodiment of a continuous wound truss structure according to the present disclosure employing carbon fiber, epoxy matrix thermoset composites and a discrete, permanent foam mandrel, respectively.
Figure 6B:
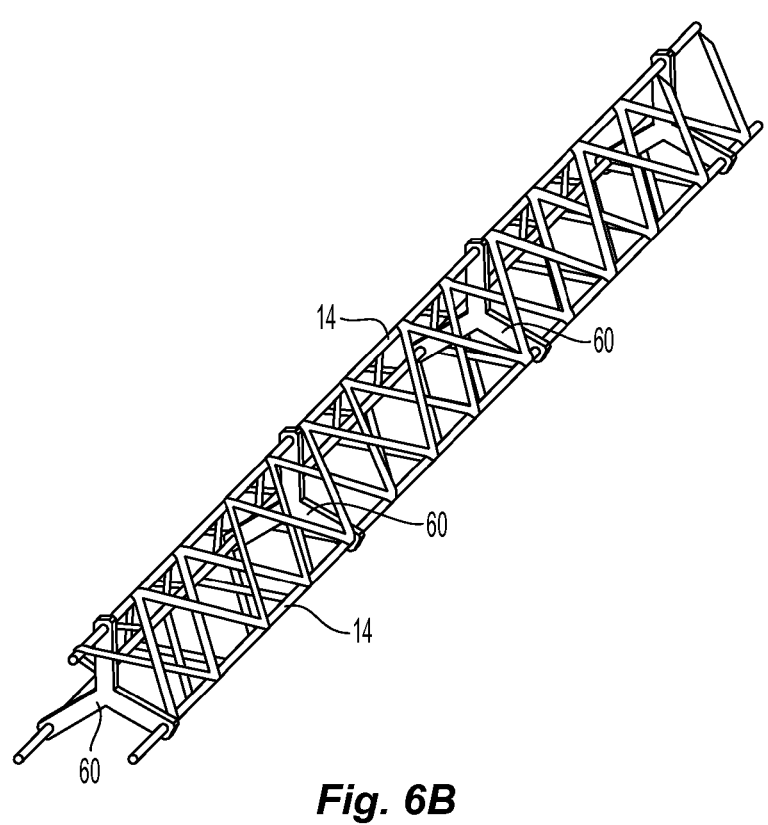

In embodiments, the mandrel may be continuous or have a plurality of sections adjacent to each other along the length of the truss structure (see, e.g., mandrel identified by reference numeral 70 in FIG. 7); or, in other embodiments, it may be discrete, with the chord members held in position at several points along their length (see, e.g., mandrel identified by reference numerals 50 and 60 in FIGS. 5, 6a, and 6b).

Figure 7:
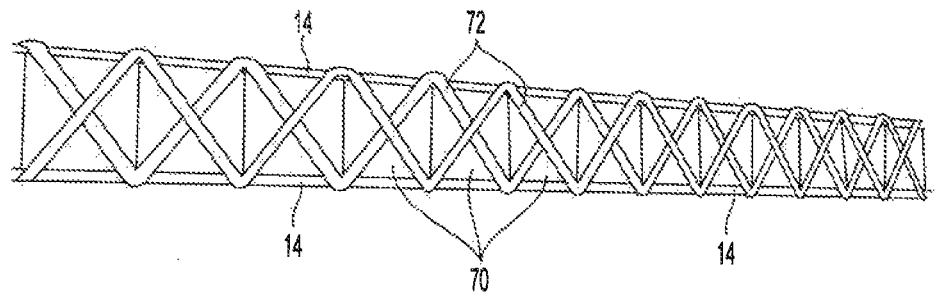
FIG. 7 illustrates a continuous wound truss structure according to still another embodiment of the present disclosure having two chord members, carbon filament web members, and a continuous permanent extruded polystyrene foam mandrel.
Figure 8:
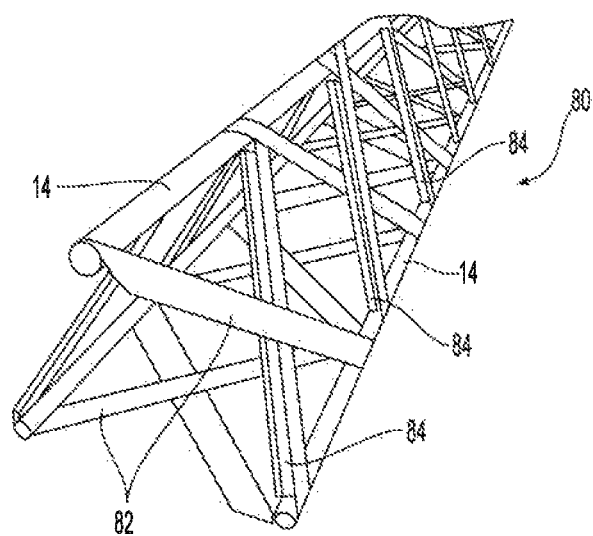
FIG. 8 illustrates a continuous wound truss structure according to a still further embodiment of the present disclosure employing reinforced web members.

In embodiments, the mandrel may be removable, or, in other embodiments, it may be a permanent part of the finished truss. If a permanent part of the truss, it may provide additional strength and stability to the web and/or chord members. In FIGS. 7 and 8, the web members are identified by reference numerals 72 and 82, respectively.

During manufacturing of the truss structure, such as truss structure 10, the mandrel 20 holding the chord members 14 together interfaces with the winding apparatus 22 (see FIGS. 3 and 4), preferably at its ends, in a manner that allows for rotation of the mandrel 20 relative to the incoming web material during winding. The chord members 14 are also held in position with respect to each other and to the mandrel 20 by clips 36 and web material 38. Tape 40 and other fastening devices can also be used.

In embodiments, the mandrel must be of sufficient strength and stiffness to resist the tension present in the web member stock during winding which would induce bending, shear and torsion loads in the mandrel. It also must resist deformation due to its own weight or any other forces applied during the manufacturing process. The mandrel may incorporate features which hold the chord members in place, and it may incorporate features to guide the web stock into a preferred position, to give a certain shape to the web members, and/or to provide consolidation pressure to the web material.

Removable mandrels may be made of materials such as metals or composites which provide the desired strength and stiffness. Elastomers such as silicone may also be used for mandrel construction due to their ability to be removed after construction despite captive geometric features that would hamper removal of a rigid mold.

In one embodiment according to the present disclosure, a silicone elastomer mandrel is used to allow for easy removal due to its flexibility, high temperature resistance, and it resistance to bonding with the various composite matrix materials. Due to low stiffness, elastomer mandrels may be stiffened with metallic or composite structural members; these structural members may be either captive to the elastomer mandrel or removable from it.

Alternatively, in embodiments, if a removable mandrel is captive due to the truss geometry used, then it may be removed through destructive means. Destroyable mandrels may be made from foams, water soluble ceramics, water soluble polymers, thermally active materials, or any other material which is easily removed through chemical, thermal or mechanical processes. Destroyable mandrels may be selectively reinforced with additional non-destroyable components to increase the strength and/or stiffness of the mandrel if desired. For instance, a water soluble ceramic may be cast around a central metallic or composite structure which is, due to its configuration, removable once the ceramic is dissolved away.

In embodiments, inflatable mandrels may also be used; either alone or in conjunction with rigid components or destroyable components which modify the geometry of the inflatable mandrel in a manner which better supports the chord or web members, or which overcomes the geometric limitations of an inflatable mandrel. In embodiments, the cross section of the mandrel may match the interior cross section of the final truss configuration, or, in other embodiments, it may have an alternative cross section for reduced cost and/or for ease of removability/reusability.

In one preferred embodiment shown in FIG. 2, the mandrel geometry is such that removal from a large aspect ratio truss is facilitated. This is accomplished by creating space between the mandrel and truss everywhere except for one small contact line between the mandrel and each chord member. Before winding, the chord members may be temporarily attached to the mandrel using clamps, lashing, tape or any other means. After the truss has been wound and is fully cured, the temporary attachments may be removed.

Due to the long length of the truss structure relative to its width (e.g. its high aspect ratio), and due to slight imperfections in the geometry of the mandrel, removal of the mandrel via a straight pull may be difficult or impossible. The extra space between the mandrel and truss structure in the preferred embodiment shown in FIG. 2a-d allows for slight rotation of the mandrel to release the truss from the mandrel, allowing much easier removal.

Figure 2A:
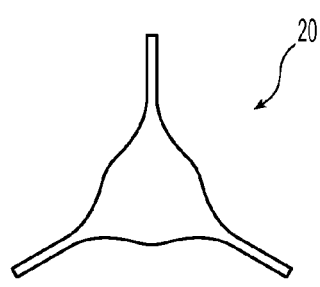
FIGS. 2a-d are cross-sectional views of a mandrel used in manufacturing the continuous wound truss structure illustrated by FIG. 1.
Figure 2B:
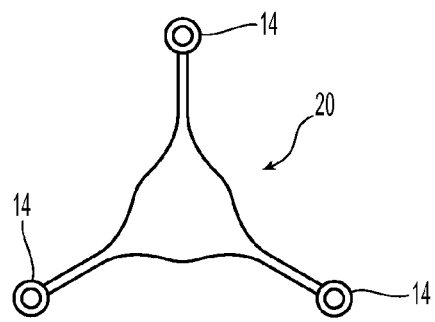
Figure 2C:
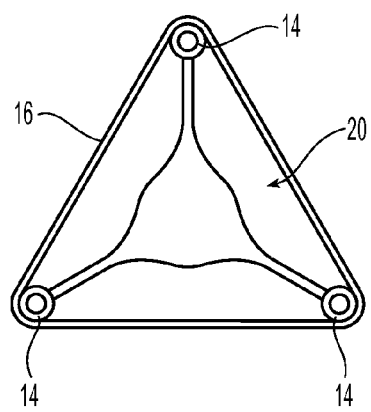
Figure 2D:
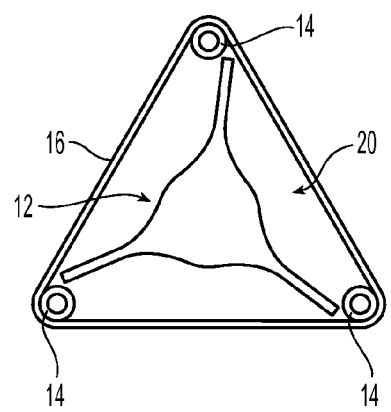

This process is demonstrated in FIG. 2a-d. FIG. 2a shows one potential removable mandrel cross section. FIG. 2b shows three chord members 14 attached to the mandrel 20. In FIG. 2c, web members 16 have been wound around the mandrel 20 and chord members 14. FIG. 2d shows how slight rotation of the finished truss relative to the mandrel 20 creates a large separation gap, allowing the mandrel 20 to be slide out and removed.

In order to facilitate the winding process, especially if the web material is to be wound by hand, the mandrel 20 may contain features which mark or otherwise guide the location of the nodes.

3. Chord Members

The chord members, such as chord members 14, of the truss structures according to the present disclosure may be premade components or they may also be created during the winding process. If the chord members are premade, they may be of any material, geometry, or construction method. In a preferred embodiment, the chord members may be pultruded fiber reinforced polymer composite rods or tubes. Tubes are preferred to solid rods because of their higher bending stiffness, strength, and buckling resistance for a given weight. Metallic, polymer, ceramic, or any other material system may also be used for the chord members so long as the material and surface preparation is amenable to bonding with the web members as they are wound in place.

In embodiments, the chord members may be created during the winding process if they are made from materials such as thermoset composites, thermoplastic composites or unreinforced thermoplastics which can be wound as described in the web member section. Any material, geometry, or configuration described for web members may also be employed for the chord members.

The chord members may also be truss structures themselves, created by any means. In a preferred embodiment, the chord members of the continuous wound truss may be made of smaller continuous wound trusses.

4. Web Members

The web members, such as web members 16, 72, and 82, employed in the truss structures according to the present disclosure may be created from a single continuous feed of material. As the mandrel is rotated relative to the winding apparatus, such as winding apparatus 22, the web material which forms the web members is fed onto the mandrel, such as mandrel 20, and advanced down the length of the truss, such as truss 12. When the end of the mandrel is reached, the web material is wrapped around a turning post or similar means and brought back down the mandrel in the opposite direction. Up and down passes may be made in this fashion until the desired number of web members has been created. In a preferred embodiment, the direction of mandrel rotation is not changed, and the mandrel continues to rotate as the web material is wrapped around the winding post, so that the process is continuous.

Any material can be used for the web members, with thermoset and thermoplastic matrix composites being the preferred choices. Thermoset matrices such as epoxy, polyester, vinylester and bismaleimide (BMI) are applicable. Thermoplastic matrices such as PEEK, PPS, PEI, PEKK, PBT, PA-6, PA-12, or PP, amongst others may be used as well. The fiber reinforcement may be any suitable material, with carbon, aramid, fiberglass, ultra high molecular weight polyethelene (UHMWPE), PBO, and basalt being the preferred materials. Metallic and ceramic fibers may also be used. The fibers may be continuous or chopped and may have any orientation relative to the matrix.

The matrix may be combined with the fiber reinforcement at any stage during the construction process. In the case of thermoset matrices, the fibers may be wetted out before or during the winding process by any means including manual application or travel through a resin bath. Pre-impregnated fiber tow, tape, or fabric which comes with the appropriate amount of resin already applied may be used.

Alternatively, the truss structure could be wound with dry fiber reinforcement, with the resin applied afterwards, by dunking in a resin bath, spray application, or any such means. For thermoplastic matrices, premade composite tubes may be used. In this embodiment, the web material would be heated up during winding, either globally or locally, such that the web material is able to bend around the chord members and to allow for thermoplastic welding between the web members and chord members. Comingled thermoplastic fibers and reinforcement fibers could also be wound, with consolidation of the composite taking place immediately before winding, during winding, or at some point after.

The fiber orientation of the web material may be changed to allow for different mechanical properties of the web members. Axially aligned fiber tow is the simplest form the web material can take. Off-axis fiber content may be added to reduce brittleness, increase torsional stiffness and strength, increase shear stiffness and strength, or for any other purpose.

Additional fiber tow at some angle to the long axis of the web material may be wound around a core of axial tow to provide this off-axis reinforcement. Alternatively, braided or woven reinforcement may be added. In a preferred embodiment, a central core of axially aligned fibers is surrounded by a helically braided sleeve of fiber reinforcement to provide a tough outer layer of off-axis reinforcement.

The cross-section of the web material may also be altered to increase performance. Flat strips of composite may be used, or the tow may be circular in cross section. In a preferred embodiment, the web material has a hollow tubular cross-section to increase the second moment of area of the web for a given weight. The cross-section of the web material may be different in the regions where it winds around the chord members in order to alter the properties of the joint between the web and chord members. For example, a tubular web material may be wound around the chord members under tension such that the tube flattens at the node locations, thereby increasing contact area and thus bond strength between the chord and web members.

Reinforcing core materials may be added to the web material to increase mechanical properties (see, e.g., FIG. 8). For instance, a truss structure may be wound using two complete wraps of web material, with a foam spacer being placed between the two layers to create a sandwich structure. Such a web member would have higher out of plane bending stiffness and higher buckling strength.

In another embodiment, the web material could be tubular, with an internal foam core. The foam core could be crushed as the web material wraps around the chord members, providing a flatter interface with high bond area, but would remain circular in cross section away from the nodes to provide optimal mechanical properties to the unsupported portion of the web member. Reinforcement could also take the form of discrete lengths of composite, metallic, polymeric, or ceramic material added internally or externally to the web material such that as the web material was wound around the mandrel, the discrete sections would fall into desired locations on the web members.

In one embodiment, web material having composite braided sleeving with discrete sections of composite tube placed inside at regular intervals could be wound such that the braided sleeve would flatten effectively at the node locations, but the internal reinforcement would remain rigid away from the nodes thereby providing increased mechanical properties to the finished web member.

Another embodiment of the present disclosure can use a truss structure of a smaller scale as the web material of a larger scale continuous wound truss structure. This truss web could be made by any means, including being continuously wound itself. In this instance, the benefits of increased structural efficiency given by a truss configuration would be applied to the individual web members as well as to the global structure.

5. Winding Apparatus

The winding apparatus, such as winding apparatus 22, includes structure for supporting and rotating the mandrel. The mandrel can be cantilevered from one end or supported at multiple points. In a preferred embodiment, the mandrel is held at its two ends and rotated using a motor. The winding process may be manual; with the web material being guided by hand over the node locations and around the turning posts at the ends of the mandrel, or it may employ varying levels of automation.

In embodiments, the winding apparatus may also include a linear traversing mechanism which guides the web material along the length of the mandrel as it rotates to create the desired angle of the web members relative to the chord members. In a preferred embodiment this angle is 45 degrees to optimize the shear and torsional load carrying capability of the web members, although any angle may be used.

The motion of the traversing mechanism may be mechanically or electronically linked to the mandrel rotation to provide a consistent wind angle. If a linear traverse is used, the winding apparatus may also include a means of changing the direction of linear motion when the end of the mandrel is reached and the web material must be wound back down in the other direction. The winding apparatus may include turning posts of some form to facilitate the change in direction of the web material required when the end of the mandrel is reached.

A web material guide head may be included if a linear traverse is present on the winding machine. This apparatus would control the position of the web material as it winds onto the mandrel. Depending on what type of web material configuration or matrix material is used, the web material guide may also perform additional functions. For instance, if a thermoset resin system is used for the matrix of the web members, the guide head may include a mechanism for guiding the fiber reinforcement into a resin bath immediately before it is wound. This bath may also include a means of removing excess resin, such as a sizing orifice, rollers, or wipers.

Alternatively, if a thermoplastic resin system is used, the guide head may include some means of heating the web material to or above its glass transition temperature such that thermoplastic welding may occur between the web material and the chord members at the node locations. This heating action may be continuous or discrete such that only the web material at or near the node locations is softened.

FIG. 4 shows an embodiment of a winding apparatus according to the present disclosure and designated generally by reference numeral 22. This apparatus 22 is intended for use with a manual, hand guided winding process, although it could be modified for an automated process. This winding apparatus 22 includes a low speed, high torque geared motor 24 which attaches to one end of the mandrel (not shown) or spindle 56. The other end of the mandrel or spindle 56 is supported in a bearing block 26 such that it is free to rotate along with the motor 24.

6. Truss Structures

A number of truss structures have been built using the continuous winding technology according to the present disclosure. Some of the different embodiments of described herein have been tried, and mechanical testing has been performed on these structures to prove their viability and structural efficiency.

As can be seen in FIG. 1, and as previously described, there is shown an embodiment of three evenly spaced chord members connected with continuous wound web members. A specimen having this geometrical configuration was made with pultruded carbon fiber epoxy tubes for the chord members and carbon fiber tow wetted out with epoxy for the web members.

Figure 3:
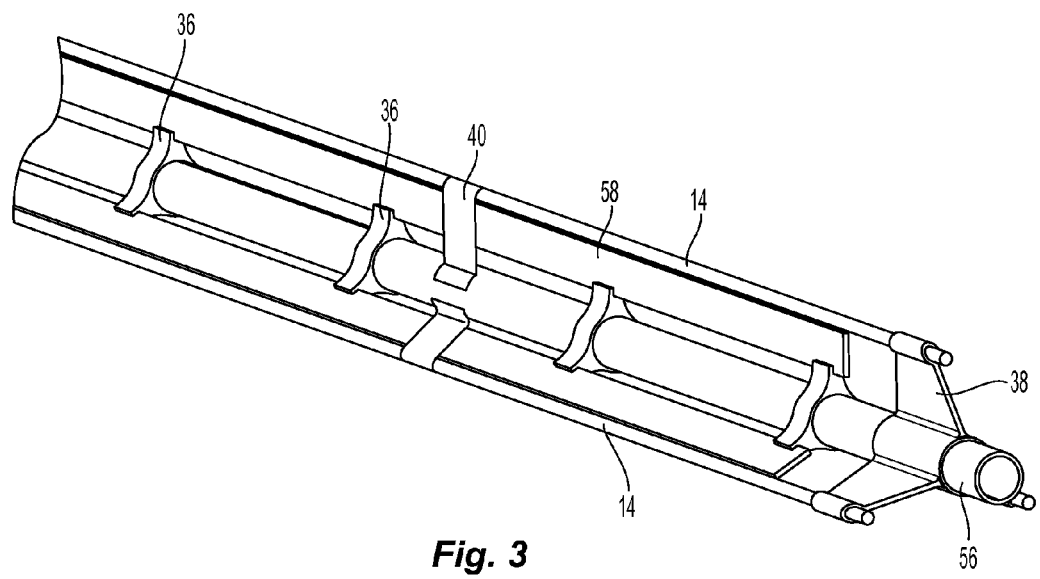
FIG. 3 illustrates a reusable mandrel with chord members taped in place ready for winding of the web members in accordance with a manufacturing process according to the present disclosure.

Another embodiment of a truss structure being built having a reusable mandrel (not shown) is shown by FIG. 3. This embodiment uses steel stringers 58 to support the chord members 14. The steel stringers 58 attach to a central carbon fiber stiffener/spindle 56 via polymer clips 36. Here, the chord members 14 may be temporarily attached to the steel stringers before winding using short sections of tape 40. The mandrel is rotated about the central carbon fiber stiffener/spindle 56 during winding. Upon completion of the winding process, the finished truss structure is removed from the mandrel by rotating the stringers 58 out of alignment with the chord members 14, then sliding the entire reusable mandrel out from inside the truss.

Embodiments of truss structures according to the present disclosure having discrete permanent mandrels are shown in FIG. 5 and FIG. 6. An embodiment of a truss structure according to the present disclosure having contacting permanent mandrels 70 is shown in FIG. 7.

An embodiment of a truss structure according to the present disclosure employing reinforced web members is shown by FIG. 8. FIG. 8 shows a continuously wound truss structure that uses foam sandwich reinforcements 84 on the web members 82 that experience compressive forces during loading. The foam core inserted between the two layers of web material increases the buckling strength of the web member and thus the amount of load the truss structure can carry with very little weight penalty.

Figure 9:
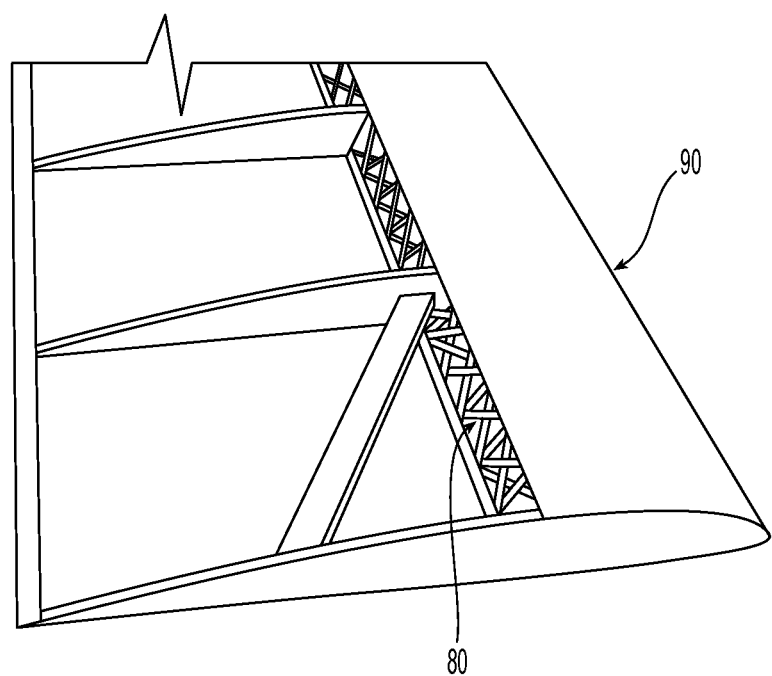
FIG. 9 illustrates a lightweight helicopter blade, or airplane wing, built around a spar made from the truss structure illustrated by FIG. 8.

Continuous wound composite truss structures have been reduced to practice as structural elements. FIG. 9 shows a lightweight helicopter blade 90, or airplane wing, built around a spar made from the truss structure 80 shown in FIG. 8.

Although the present disclosure has been described in considerable detail with reference to certain embodiments, other embodiments and versions are possible and contemplated. Therefore, the spirit and scope of the appended claims should not be limited to the description of the embodiments contained therein.

The invention claimed is:

1. A truss structure manufactured using a winding process, the process comprising the steps of:
    fastening at least two chord members in proximity to each other around at least one mandrel;
    operatively connecting the at least one mandrel and the at least two chord members to a winding apparatus;
    actuating the winding apparatus to rotate the at least one mandrel and the at least two chord members to wind material around at least the two chord members from a first location to a second location which is spaced apart from the first location wherein winding the material around the at least two chord members creates a portion of the truss structure; and removing each of the at least one mandrel after completion of the actuating step.

2. The truss structure according to claim 1, wherein, during the actuating step, the material continuously winds around the at least two chord members and makes contact with the at least two chord members at repeating intervals.

3. The truss structure according to claim 1, wherein a plurality of continuous wound web members is formed along the truss structure from a continuous section of the material.

4. The truss structure according to claim 1, wherein the truss structure comprises the at least two chord members extending the length of the truss structure and contacting a plurality of continuous web members wrapped around the at least two chord members.

5. The truss structure according to claim 3, wherein the plurality of continuous wound web members wrap around the at least two chord members in a quasi-helical fashion.

6. The truss structure according to claim 1, in which the at least one mandrel extends substantially the length of the truss structure.

7. The truss structure according to claim 1, wherein the truss structure includes fiber reinforced composite materials.

8. The truss structure according to claim 1, wherein the first location is in proximity to a first end of the at least two chord members and the second location is in proximity to a second end of the at least two chord members.

9. The truss structure according to claim 1, wherein the actuating step comprises actuating the winding apparatus in one of manually and automatically.

10. A truss structure comprising:
at least two chord members extending the length of the truss structure; and
material wound around the at least the two chord members from a first location to a second location which is spaced apart from the first location, wherein the material wound around the at least two chord members forms a plurality of continuous wound web members between the first location and the second location, and wherein the at least two chord members and the material wound around the at least two chord members define an internal volume that is free of structure therewithin.

11. The truss structure according to claim 10, wherein the plurality of continuous wound web members contact the at least two chord members at repeating intervals from the first location to the second location.

12. The truss structure according to claim 10, wherein the material forming the plurality of continuous wound web members is wound around the at least two chord members in a quasi-helical fashion.

13. The truss structure according to claim 10, wherein the internal volume is configured to accommodate and subsequently remove a mandrel or a plurality of mandrels that extend in proximity to the at least two chord members.

14. The truss structure according to claim 10, wherein the internal volume is configured to accommodate and subsequently remove a mandrel that extends or a plurality of mandrels that extend the length of the truss structure.

15. The truss structure according to claim 10, further comprising a plurality of reinforcement members each attached to a respective member of the plurality of continuous wound web members.

16. The truss structure according to claim 10, wherein the first location is in proximity to a first end of the at least two chord members and the second location is in proximity to a second end of the at least two chord members.

17. The truss structure according to claim 10, wherein the truss structure includes fiber reinforced composite materials.

18. The truss structure according to claim 10, wherein the truss structure is manufactured using a continuous winding process for winding the material around the at least two chord members.

19. The truss structure according to claim 13, wherein the internal volume defines a cross-section that is identical to a cross-section of a mandrel around which the truss structure is manufactured.

20. A method for manufacturing a truss structure comprising the steps of:
fastening at least two chord members in proximity to each other around at least one mandrel;
operatively connecting the at least one mandrel and the at least two chord members to a winding apparatus;
actuating the winding apparatus to rotate the at least one mandrel and the at least two chord members to wind material around at least the two chord members from a first location to a second location which is spaced apart from the first location, wherein each pass of the material wound around the at least two chord members creates a portion of the truss structure; and
removing each of the at least one mandrel after completion of the actuating step.

21. The method according to claim 20, wherein during the actuating step, the material continuously winds around the at least two chord members and makes contact with the at least two chord members at repeating intervals.

22. The method according to claim 20, wherein a plurality of continuous wound web members is formed along the truss structure from a continuous section of the material.

23. The method according to claim 20, wherein the truss structure comprises the at least two chord members extending the length of the truss structure and is in contact with a plurality of continuous wound web members wrapped around the at least two chord members.

24. The method according to claim 22, wherein the material forming the plurality of continuous wound web members is wrapped around the at least two chord members in a quasi-helical fashion.

25. The method according to claim 20, wherein the step of fastening at least two chord members in proximity to each other around at least one mandrel includes fastening at least one mandrel that extends the length of the truss structure.

26. The method according to claim 20, wherein the step of fastening at least two chord members in proximity to each other around at least one mandrel includes fastening a plurality of mandrels along the length of the truss structure.

27. The method according to claim 20, further comprising providing at least one reinforcement member at least one selected location of the wound material.

28. The method according to claim 20, wherein the first location is in proximity to a first end of the at least two chord members and the second location is in proximity to a second end of the at least two chord members.

29. The method according to claim 20, wherein the actuating step comprises actuating the winding apparatus in one of manually and automatically.

* * * * *